United States Patent
Heimberg

(10) Patent No.: US 12,151,365 B2
(45) Date of Patent: Nov. 26, 2024

(54) GRIPPER DEVICE FOR GRIPPING LABORATORY VESSELS

(71) Applicant: HTI Automation GmbH, Ebersberg (DE)

(72) Inventor: Wolfgang Heimberg, Ebersberg (DE)

(73) Assignee: HTI Automation GmbH, Ebersberg (DE)

( * ) Notice: Subject to any disclaimer, the term of this patent is extended or adjusted under 35 U.S.C. 154(b) by 592 days.

(21) Appl. No.: 17/432,632

(22) PCT Filed: Jan. 9, 2020

(86) PCT No.: PCT/EP2020/050422
§ 371 (c)(1),
(2) Date: Aug. 20, 2021

(87) PCT Pub. No.: WO2020/144275
PCT Pub. Date: Jul. 16, 2020

(65) Prior Publication Data
US 2022/0212351 A1 Jul. 7, 2022

(30) Foreign Application Priority Data

Jan. 11, 2019 (DE) ...................... 10 2019 100 655.4
Apr. 3, 2019 (DE) ...................... 10 2019 108 767.8

(51) Int. Cl.
*B25J 15/02* (2006.01)
*B25J 15/10* (2006.01)

(52) U.S. Cl.
CPC ......... *B25J 15/028* (2013.01); *B25J 15/0226* (2013.01); *B25J 15/10* (2013.01)

(58) Field of Classification Search
CPC .. B25J 15/022; B25J 15/0226; B25J 15/0266; B25J 15/028; B25J 15/10; B25J 15/106
(Continued)

(56) References Cited

U.S. PATENT DOCUMENTS 1,575,185 A * 3/1926 Stenhouse ............... C03B 9/447
414/753.1
3,144,947 A * 8/1964 Pittwood .................. B25J 15/10
414/730
(Continued)

FOREIGN PATENT DOCUMENTS

DE 29 04 378 A1 8/1980
DE 31 33 205 C2 3/1986
(Continued)

OTHER PUBLICATIONS

International Search Report of the International Searching Authority, mailed on Aug. 5, 2020, from International Application No. PCT/EP2020/050422, filed on Jan. 9, 2020. 4 pages.
(Continued)

Primary Examiner — Dean J Kramer
(74) Attorney, Agent, or Firm — HoustonHogle LLP

(57) ABSTRACT

A gripper device for gripping lids of laboratory vessels. The gripper device comprises a gripper unit with a main body, to which two gripper levers are each pivotably fastened by one end to a pivoting joint in each case. A gripper jaw is formed at the end of each gripper lever remote from the respective pivoting joint, such that the gripper jaws are arranged facing one another. A guiding element is provided which is movably mounted on the main body and two inner and outer guiding faces are formed on the guiding element or on the gripper levers respectively. The gripper levers or the guiding element each have a counter-guiding element which is arranged between one of the inner and one of the outer guiding faces, so that when the guiding element is moved, the gripper levers with their gripper jaws are pivoted apart or pressed together.

17 Claims, 13 Drawing Sheets

Figure 1:
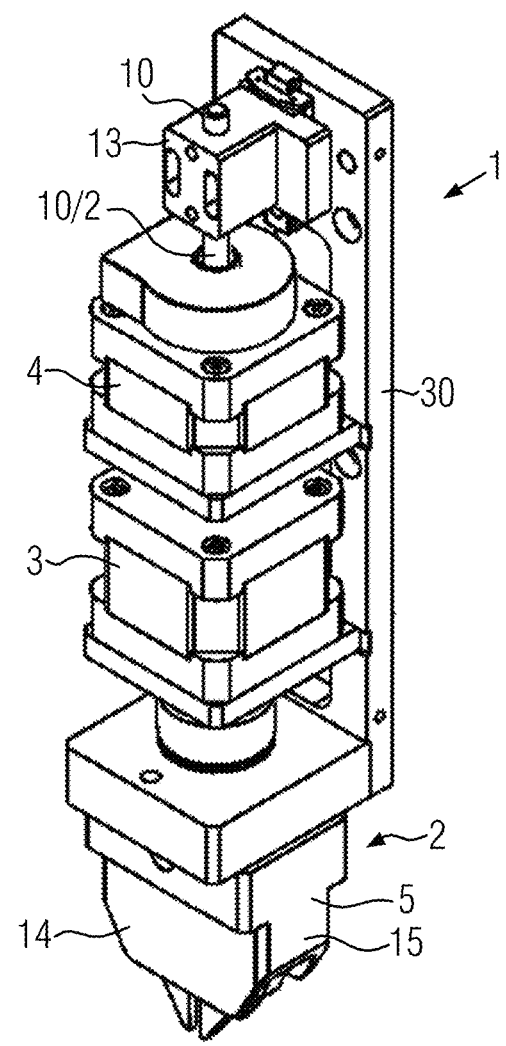

(58) Field of Classification Search
USPC .................................................. 294/116, 203
See application file for complete search history.

(56) References Cited

U.S. PATENT DOCUMENTS

| | | | | |
|---|---|---|---|---|
| 3,764,023 | A | 10/1973 | Jatcko | |
| 4,169,621 | A * | 10/1979 | McGill | B65G 47/90 294/116 |
| 4,348,044 | A * | 9/1982 | Wood, III | B65G 47/90 294/115 |
| 4,627,654 | A * | 12/1986 | Van Oost | B25J 15/103 294/195 |
| 4,667,908 | A | 5/1987 | Hayden et al. | |
| 4,697,839 | A | 10/1987 | Fischer | |
| 5,222,421 | A | 6/1993 | Ushiro | |
| 5,301,533 | A | 4/1994 | Jackson | |
| 5,455,006 | A * | 10/1995 | Aota | G01N 35/04 422/561 |
| 5,481,951 | A | 1/1996 | Kiefer | |
| 5,693,113 | A * | 12/1997 | Dries | C03C 17/005 65/239 |
| 5,967,581 | A * | 10/1999 | Bertini | B25J 15/0253 294/207 |
| 6,988,651 | B2 | 1/2006 | Stevenson et al. | |
| 8,439,414 | B2 * | 5/2013 | Neeper | B25J 15/0028 294/902 |
| 2008/0289463 | A1 | 11/2008 | Rehm | |
| 2015/0166208 | A1 | 6/2015 | Miyauchi | |
| 2016/0332271 | A1 | 11/2016 | Maurer et al. | |

FOREIGN PATENT DOCUMENTS

| | | | |
|---|---|---|---|
| DE | 30 48 522 C2 | 9/1986 | |
| DE | 3504233 A1 | 11/1986 | |
| DE | 36 17 493 A1 | 11/1987 | |
| DE | 3914583 A1 | 11/1989 | |
| DE | 39 10 801 A1 | 10/1990 | |
| DE | 102008035021 A1 * | 1/2010 | ......... B25J 15/0226 |
| DE | 20 2008 016 152 U1 | 4/2010 | |
| DE | 102011115366 A1 | 4/2013 | |
| DE | 10 2016 111 125 A1 | 12/2017 | |
| EP | 0 086 054 A2 | 8/1983 | |
| EP | 1 415 773 B1 | 7/2008 | |
| EP | 2605891 A1 | 6/2013 | |
| GB | 2018220 A | 10/1979 | |
| JP | H10167657 A | 6/1998 | |
| JP | 2011156614 A | 8/2011 | |

OTHER PUBLICATIONS

Written Opinion of the International Searching Authority, mailed on Aug. 5, 2020, from International Application No. PCT/EP2020/050422, filed on Jan. 9, 2020. 21 pages.

International Preliminary Report on Patentability, issued on Jun. 16, 2021, from International Application No. PCT/EP2020/050422, filed on Jan. 9, 2020. 23 pages.

Examination Notice mailed on Apr. 10, 2024, from German Application No. 11 2020 000 392.2, filed on Jan. 9, 2020. 14 pages.

* cited by examiner

GRIPPER DEVICE FOR GRIPPING LABORATORY VESSELS

RELATED APPLICATIONS

This application is a § 371 National Phase Application of International Application No. PCT/EP2020/050422, filed on Jan. 9, 2020, now International Application Publication No. WO 2020/144275 A2, published on Jul. 16, 2020, which claims priority to German Application No. 10 2019 100 655.4, filed on Jan. 11, 2019, and German Application No. 10 2019 108 767.8, filed on Apr. 3, 2019, all of which are incorporated herein by reference in their entirety.

The present invention relates to a gripper device for gripping laboratory vessels.

Gripper devices for gripping lids of laboratory vessels are essentially known. They are used especially in devices for the screwing and unscrewing of lids for laboratory vessels.

Conventional gripper devices for gripping lids have a pneumatic opening mechanism. Each pneumatic device represents a source of contamination risk for the contamination of chemical or biological substances which are held in laboratory vessels.

The laboratory vessels are often held in a rack in a two-dimensional array. In this array, the lids of individual laboratory vessels must be gripped. The space between adjacent laboratory vessels is limited. Consequently, the gripper jaws of the lid gripper device are opened only as far as necessary, so as not to touch adjacent laboratory vessels.

There is a variety of different gripper devices. Gripper devices are known for example from GB 2018220 A, DE 10 2016 111 125 A1, DE 31 33 205 C2, EP 1 415 773 B1, DE 30 48 522 C2, DE 20 2008 016 152 U1, US 2008/0289463 A1, US 2016/0332271 A1, U.S. Pat. Nos. 5,222,421, 5,481,951, 4,667,908, DE 39 10 801 A1 or DE 36 17 493 A1.

These known gripper devices often have a complex mechanism in order to press together or open gripper jaws lying opposite one another.

DE 29 04 378 A1 discloses a gripper device of the pliers type with two pivotable gripper arms and which is relative simple in design. The gripper arms are arranged like pliers with a common joint. Gripper jaws are formed at one end of the pliers. At the other end, guide slots are made in the gripper arms, with guide pins engaging in each of them. The guide pins are fixed to a guiding element which may be so moved by means of a pneumatic cylinder that the pliers are opened and closed. This gripper device is used for gripping workpieces produced on a lathe or other machine tool.

The invention is based on the problem of creating a gripper device for the gripping of laboratory vessels which is of simple design, with which lids of different size may be gripped reliably, and with which lids may also be gripped with limited available space.

The problem is solved by a gripper device with the features of the independent claims. Advantageous variants are set out in the dependent claims.

A gripper device according to the invention comprises a gripper unit with a main body, to which two gripper levers are each pivotably fastened by one end to a pivoting joint in each case. A gripper jaw is formed at the end of each gripper lever remote from the respective pivoting joint, such that the gripper jaws are arranged facing one another. A guiding element is provided which is movably mounted on the main body. Two inner and outer guiding faces are formed on the guiding element or on the gripper levers respectively, and the gripper levers or the guiding element each have a counter-guiding element which is arranged between one of the inner and one of the outer guiding faces, so that when the guiding element is moved, the gripper levers with their gripper jaws are pivoted apart or pressed together.

The opening mechanism involving the guiding element, the guiding faces and the counter-guiding element is very simple in design and allows the conversion of a straight-line movement into an opening or closing movement of the gripper levers. By this means it is possible to open and close the gripper levers in a controlled manner and also to open them to a varying extent, so that even with restricted space, as for example with laboratory vessels arranged in a rack, targeted insertion of the gripper levers into the space between adjacent laboratory vessels is possible, and a laboratory vessel lid may be gripped.

The gripper levers are in each case fastened pivotably by one end to a pivoting joint, while at the other end there is in each case a gripper jaw. Because of this, in comparison with a pliers-like gripper element, as known for example from DE 29 04 378 A1, the pivoting angle is small relative to the distance covered by the gripper jaws in a pivoting movement. By this means, the inclined position of the gripper jaws is minimised relative to the lid to be gripped. This allows on the one hand the reliable gripping of bodies of different size, in particular lids of varying size. On the other hand, the gripper jaws may, in the case of limited space conditions, be inserted reliably into the relevant free spaces, since they have only a minimal inclined position and require little space for themselves.

A device may be provided to adjust the spacing of the pivoting joints. This device may comprise for example a threaded spindle with two threads, opposite in sections, to which the pivoting joints are each connected by a nut. By rotating the spindle, the two pivoting joints are moved away from or towards one another. By this means it is possible to adjust the angle at which the gripper jaws grip a lid. Consequently, lids of different size may be gripped reliably. For this purpose the threaded spindle may be single-, double-, or multi-threaded.

The guiding element is preferably loaded by means of a spring in such a way that, in the relaxed state of the spring, the gripper jaws are pressed together. In this relaxed state, however, the spring is not fully relaxed, but only slightly preloaded. Because of this, a lid may be held in the gripper device on the basis of the spring tension alone. The preload of the spring is preferably adjustable.

The guiding element may be connected to a guide rod, which is guided in a guiding bush formed on the main body. The gripper levers are arranged with approximate mirror-symmetry to the guide rod. By means of the guide rod, the guiding element is actuated to open and close the gripper device. The guide rod is preferably arranged roughly along a longitudinal centre axis of the gripper device.

The gripper levers are preferably so arranged, rotationally symmetric or mirror-symmetric to the longitudinal centre axis of the gripper device, that they do not cross the longitudinal centre axis.

The gripper device may have a gripper unit with three or four gripper levers. From at least three gripper levers upwards, in a top view, circular reaction vessels or their lids are centred during gripping. In such an embodiment, the gripper jaws may be of very simple design, forming for example just an edge on the gripper lever.

According to a further aspect of the present invention, a gripper unit has precisely four gripper levers, arranged in particular with rotational symmetry around the longitudinal axis. The gripper levers, during opening and closing of the gripper unit, may be moved in a straight line radially outwards or inwards relative to a longitudinal centre axis. Such a gripper unit is very advantageous, since the gripper levers may be moved into the spandrels between reaction vessels or their lids arranged in a regular grid and reliably grip a lid or a reaction vessel even under restricted space conditions, since the gripper levers are moved in a straight line radially inwards on to the respective lid or the respective reaction vessel. "In a straight line radially" means that the gripper arms are moved along straight lines which all intersect in a star-shaped pattern at the longitudinal centre axis. The gripper arms are not moved inwards in a screw-like movement. There is no room for this in the spandrels.

According to yet a further aspect of the present invention, the gripper device may have gripper levers, each formed with a parallel guide, arranged pivotably on a main body. Provided on the end of the parallel guide of the gripper lever is a gripper section, on each of which one of the gripper jaws is formed. Because of the parallel guide, the gripper sections hold their parallel position to one another, or to a longitudinal centre axis of the gripper device or the gripper unit, when the gripper arms are pivoted. This allows the gripping of lids or reaction vessels of different size.

A gripper unit with four rotationally symmetric gripper levers, each formed by a parallel guide, is especially advantageous, since it enables easy insertion into the spandrels between reaction vessels and/or their lids, since the gripper sections are arranged roughly parallel to the longitudinal axis of the gripper device and may therefore be arranged parallel to the longitudinal axis of the reaction vessels. The gripper sections may therefore be moved vertically downwards into the spandrels. The gripper sections are preferably thin pins.

To actuate the guiding element, an actuator may be provided, which moves the guiding element in a straight line. The actuator is preferably a spindle drive driven by an electric motor. In contrast to pneumatic and hydraulic actuators, electric motors are suitable for clean-room and contamination-risk applications.

Alternatively, the actuator may also have a linear drive, preferably driven by an electromagnet. In applications which do not involve clean-room requirements, the drive of the linear motor may also be a pneumatic cylinder or an hydraulic cylinder.

A motor may also be provided for rotating the gripper unit. The motor is in turn preferably an electric motor, in particular a step motor, so that the angle of rotation of the gripper unit may be controlled exactly.

The motor is preferably driven by a control unit, which is able to set the torque with which the gripper unit is rotated. By this means, the torque exerted on the lid may be set.

The motor is preferably coupled to the gripper unit by means of a tubular shaft. Because of this, the guide rod may be guided through the shaft. The actuator may act on the guide rod to generate linear movement of the guiding element. The gripper unit, the motor for rotating the gripper unit and the actuator for linear movement of the guiding element may therefore be arranged in a line with one another. Depending, however on the available installation space, other configurations may also be expedient. Thus, the motor for rotating the gripper unit may be located a short distance from the tubular shaft and, by means of a belt, transmit a rotary movement to the shaft. Because of this, the motor for rotating the gripper unit and the actuator may be arranged alongside one another with respect to the rotary shaft and the guide rod respectively.

The counter-guiding elements are preferably in the form of sliding elements. The sliding elements may be ball bearings or slide pins, for example of a metal with low coefficient of friction, as for example PTFE. These sliding elements may slide along the guiding faces, with the rolling of a ball bearing along the guiding face also being regarded as sliding.

The counter-guiding elements are preferably arranged with minimal play between each of the inner and outer guiding faces. Because of this, each counter-guiding element is in each case in contact only with one of the inner or only with one of the outer guiding faces. The play is preferably a few μm, so that the hysteresis of the gripper device is as low as possible. The play is preferably minimal at the end sections of the guiding faces, so as to obtain defined end positions of the gripper jaws in the opened and closed state of the gripper device. In the intermediate areas, a greater or a large amount of play may indeed be provided, which does lead to a correspondingly large hysteresis but ensures ease of movement.

The guiding faces may be made roughly straight, with a certain inclination relative to the longitudinal centre axis of the gripper device. In this way, during movement of the guiding element, the gripper jaws are opened and closed in proportion to the movement travel of the guiding element.

The guiding faces may however also form a curved path with path sections inclined differently relative to the longitudinal centre axis of the gripper device, wherein the path sections located close to the longitudinal centre axis preferably have a lesser inclination relative to the longitudinal centre axis than the path sections located further away. With the same distance of travel of the guiding element, the more sharply inclined path sections lead to greater opening or closing of the gripper jaws than the less inclined sections of the guiding faces. On the other hand, the less inclined guiding faces generate, on closing, a greater closing force than the more strongly inclined sections. High closing forces are necessary in particular in the pressed-together state of the gripper device, for which reason the less inclined path sections are preferred close to the longitudinal centre axis.

Preferably the inclination of the guiding faces is so designed that, for opening the gripper device, the guiding element is to be moved towards the gripper jaws and in its end position comes to lie adjacent to the gripper jaws. Through this, the guiding element serves as ejector for a lid gripped between the gripper jaws. The guiding element may also have for this purpose a projection, protruding in its end position into the area between the gripper jaws. This projection may also be spring-loaded. Consequently, during movement to open the gripper jaws, not only are the gripper jaws opened, but also at the same time a lid or other body located between the gripper jaws is ejected. The gripper jaws have cutting edges, to grip the body reliably. This can however lead to the body or lid adhering to the gripper jaws, even though these are already opened a little. They are then finally ejected through pressure-loading by the guiding element. If the guiding faces are formed on the guiding element and the counter-guiding elements are provided on the gripper levers, then the guiding faces have, with increasing distance from the gripper jaws, a greater distance from the longitudinal centre axis of the gripper device, so that closing of the gripper jaws takes place when the guiding element is moved towards the gripper jaws. If on the other hand the guiding faces are provided on the gripper levers and the counter-guiding elements on the guiding element, then the distance of the guiding faces from the longitudinal centre axis is less, the further the guiding faces are from the gripper jaws.

The gripper jaws preferably have in a top view a stepped gripping face, wherein the steps extend roughly parallel to the longitudinal centre axis of the gripper device and are arranged along a circular segment surface which is formed roughly concentric to the longitudinal centre axis of the gripper device. Because of this, cylindrical bodies of varying diameter may be gripped reliably, in each case being in contact with edges formed by the steps of a gripper jaw. Depending on the size of the lid, these are different edges of different steps.

Alternatively, the gripper jaws may each have only one or two gripping edges formed parallel to the longitudinal centre axis of the gripper device. These gripping edges are preferably in the form of cutting edges. This is in particular expedient if the gripper device is intended to grip lids made of plastic. These may then be held reliably by the cutting edges.

The gripper jaws with their gripping faces may be formed by sections with varying inclination relative to the longitudinal centre axis of the gripper device. Because of this, the gripper jaws are able to grip cylindrical bodies of differing diameter, wherein in each case one of the portions of the gripper jaws lies roughly flat on the outer surface of the cylindrical body. This is especially advantageous for gripping lids of varying size with a cylindrical wall.

The benefits obtained with the gripper device described above are briefly summarised below:
- targeted control of the opening and closing movement is possible. The gripper jaws may be opened or moved together to a differing extent.
- lids of laboratory vessels may be gripped reliably, even if only a small hole around the respective lid is free.
- automatic ejection may be effected on opening the lid.
- a rotating device with a motor may be integrated in the gripper device, so that the gripper device itself may be used for screwing and unscrewing lids of laboratory vessels.
- the guiding faces and the corresponding counter-guiding elements form a slotted link guide. The guiding faces may be so designed that any desired travel-force conversion of the movement of the guiding element into a gripping force of the gripper jaws is possible.
- the drives (actuator; rotating device) may be electric, so that the gripper device is suitable for clean-room or contamination risk applications.
- lids of varying sixe may be gripped reliably.

With such a gripper device, a laboratory vessel may be gripped directly on its body or on a lid applied to it.

The aspects of the invention described above may be used independently of one another or in any desired combinations.

Figure 2:
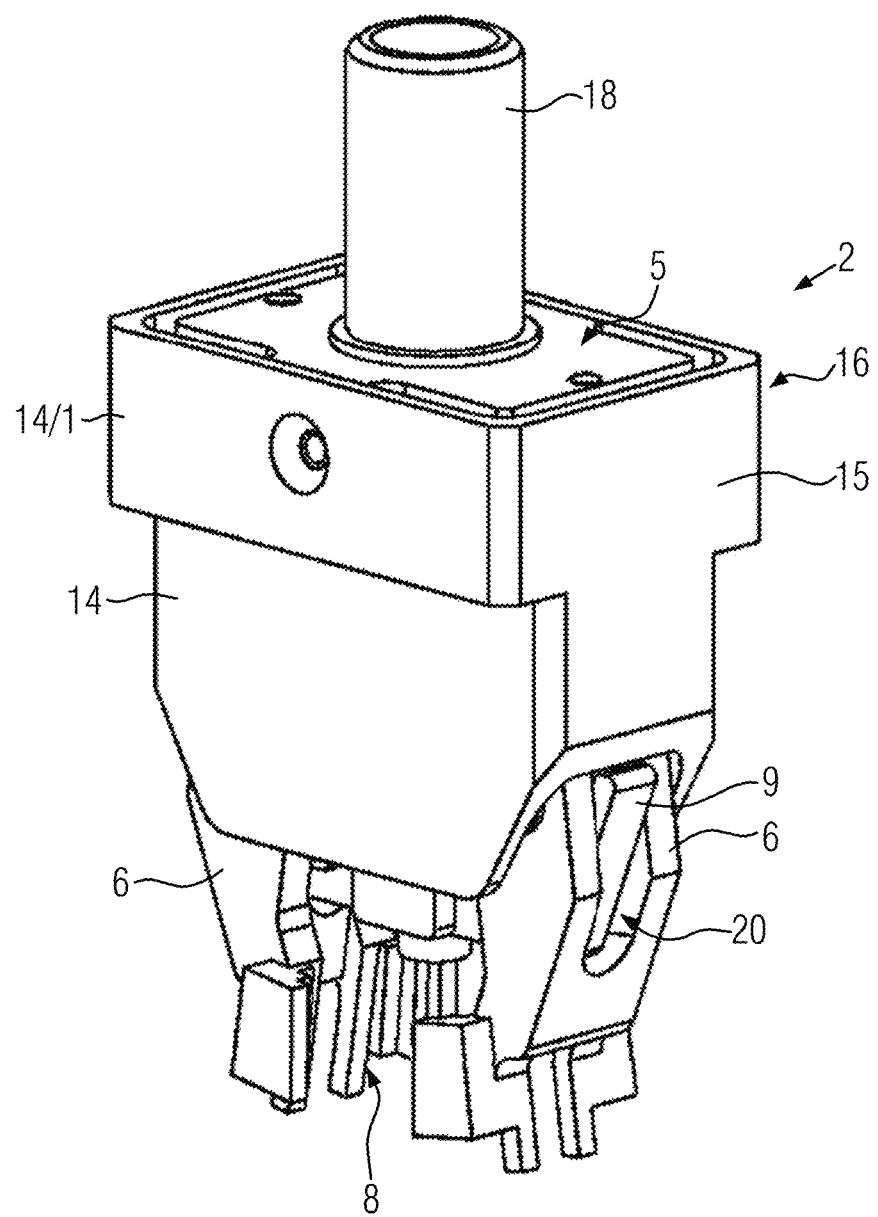
Figure 3A:
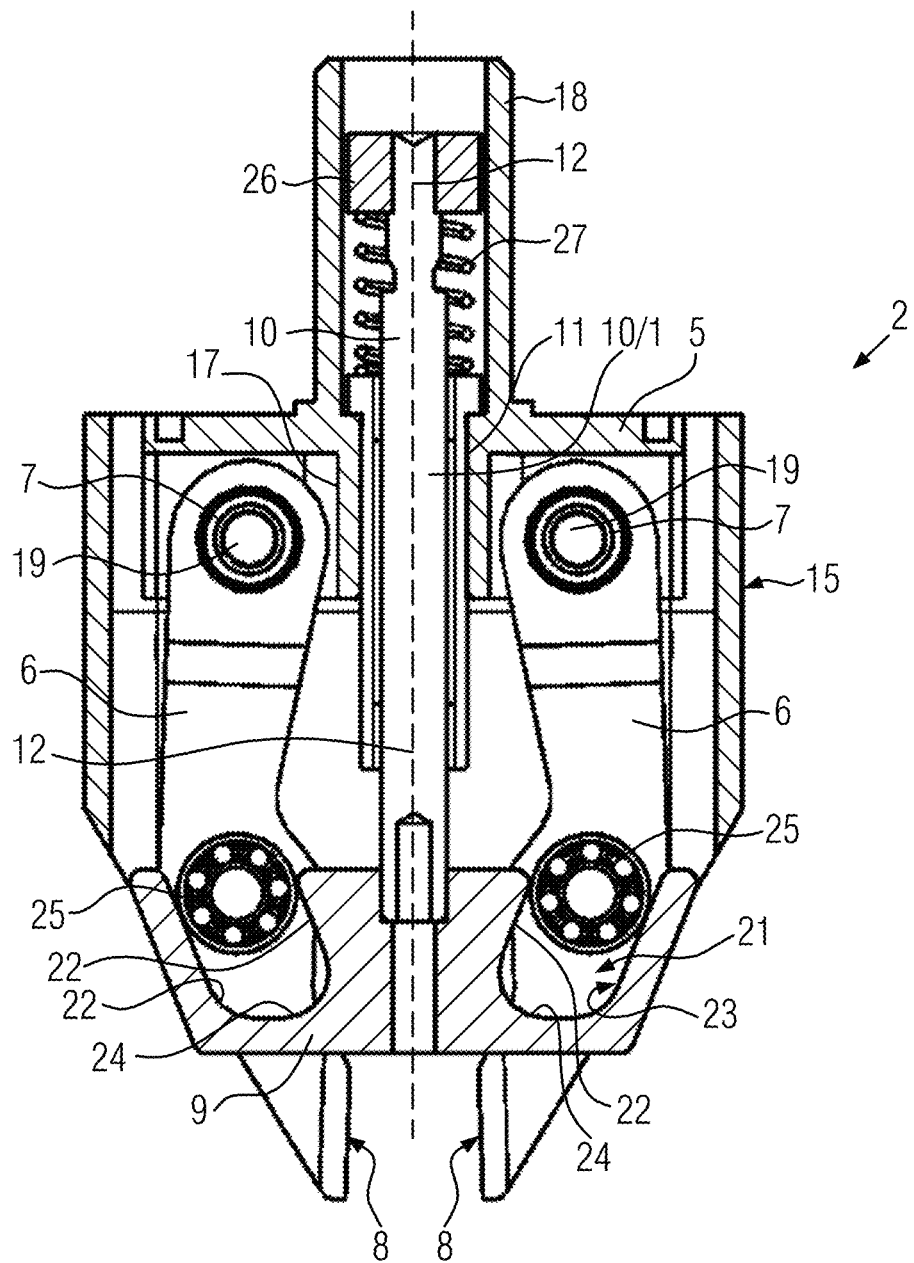
Figure 3B:
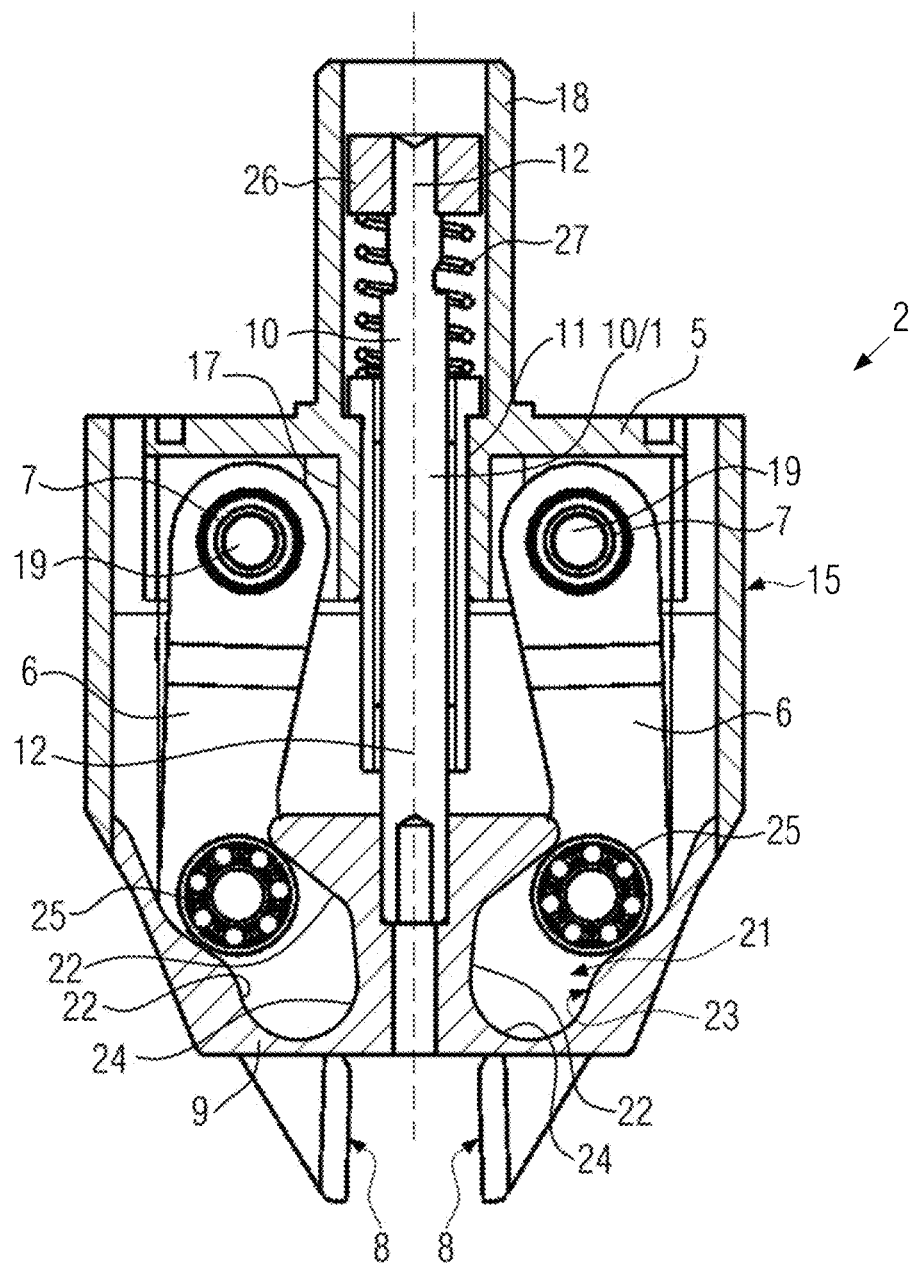
Figure 4:
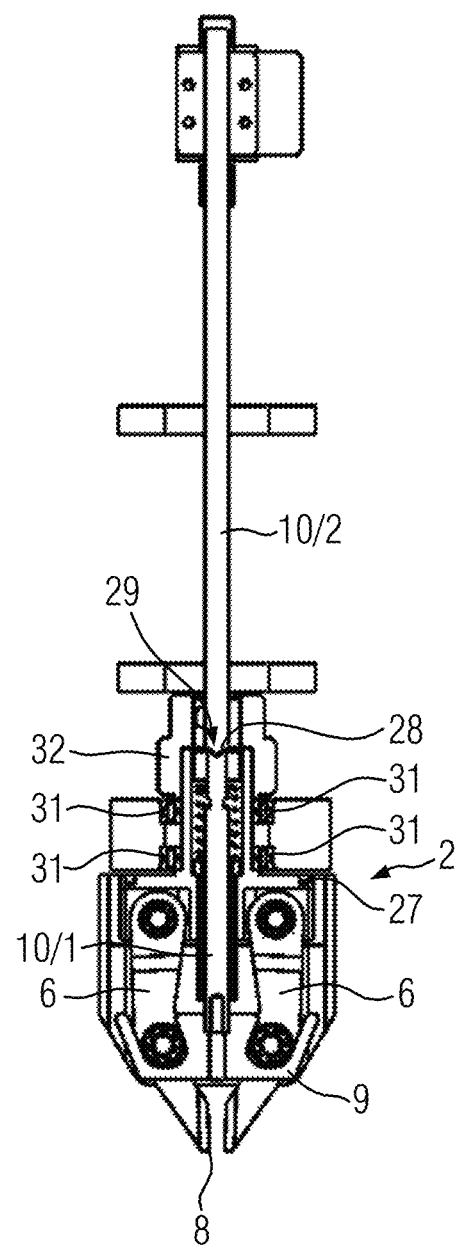
Figure 5:
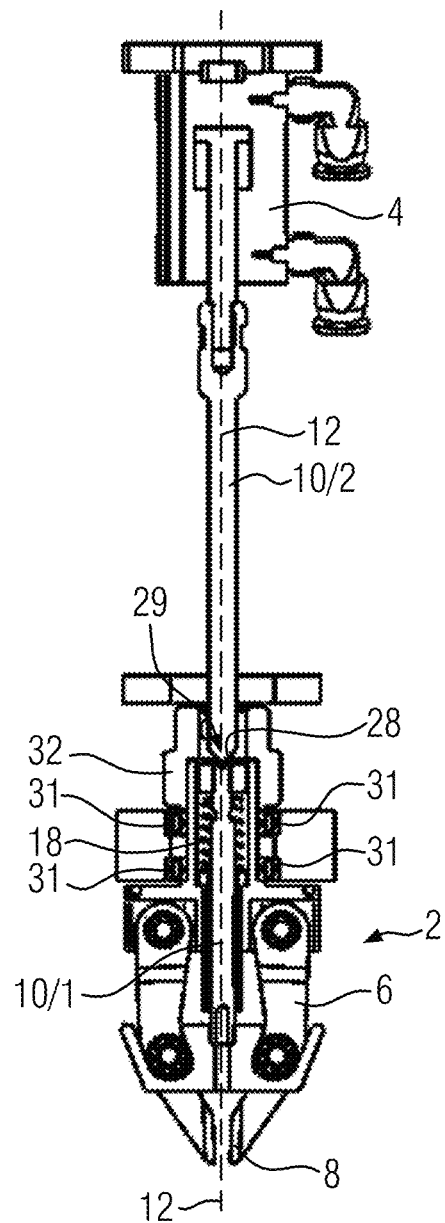
Figure 6:
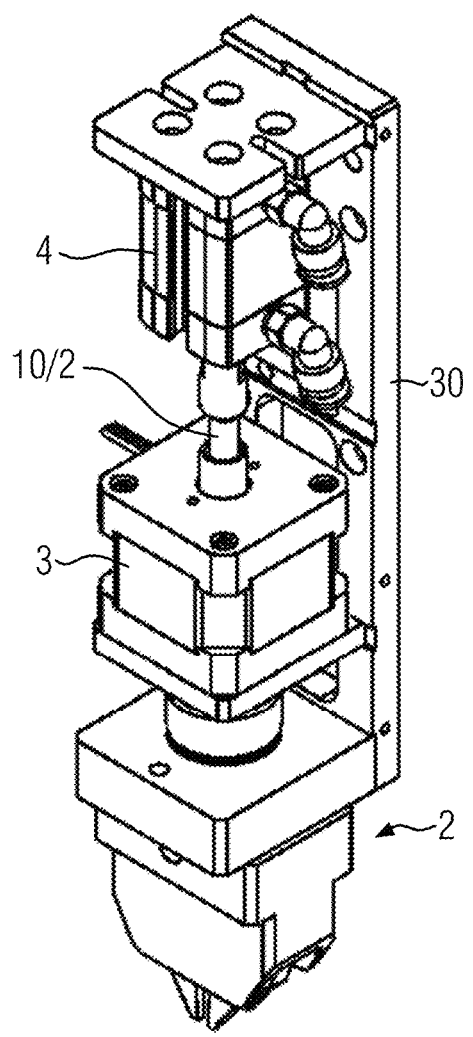
Figure 7:
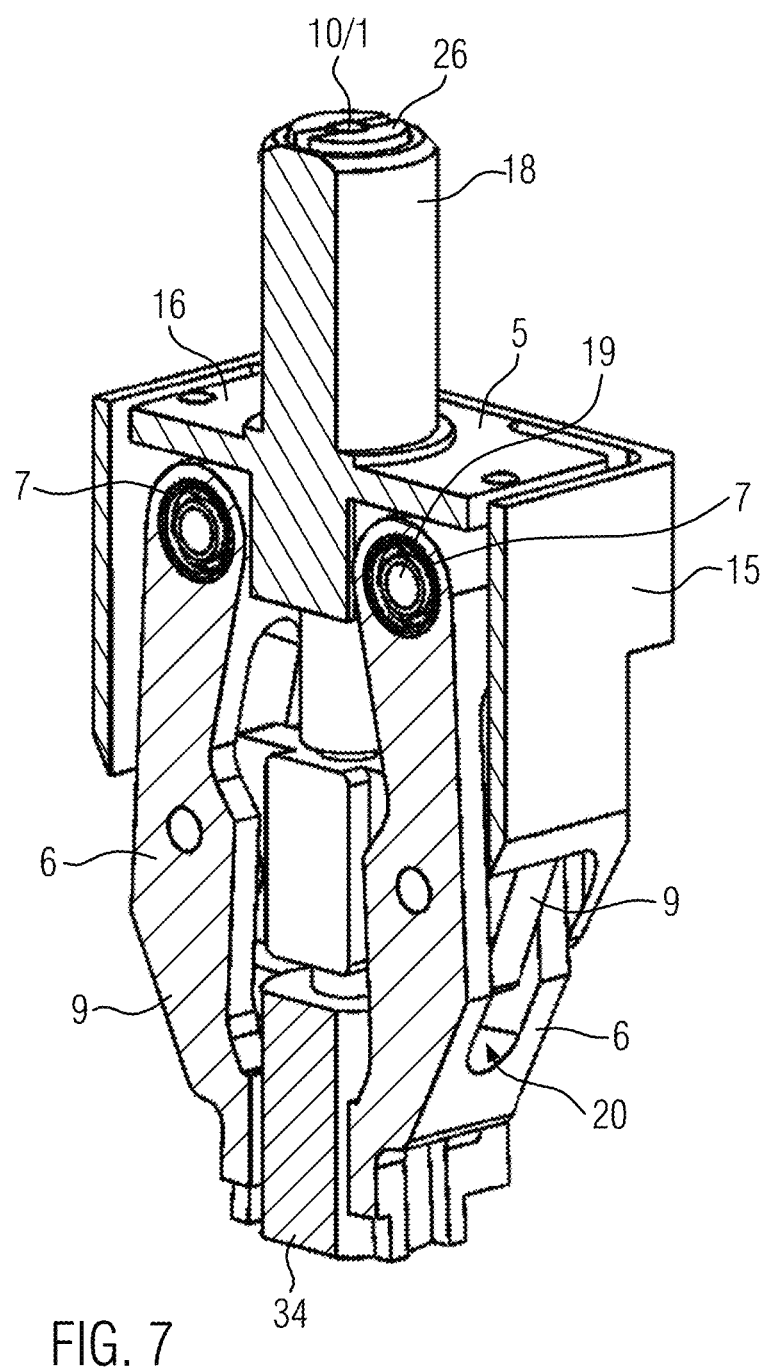
Figure 8:
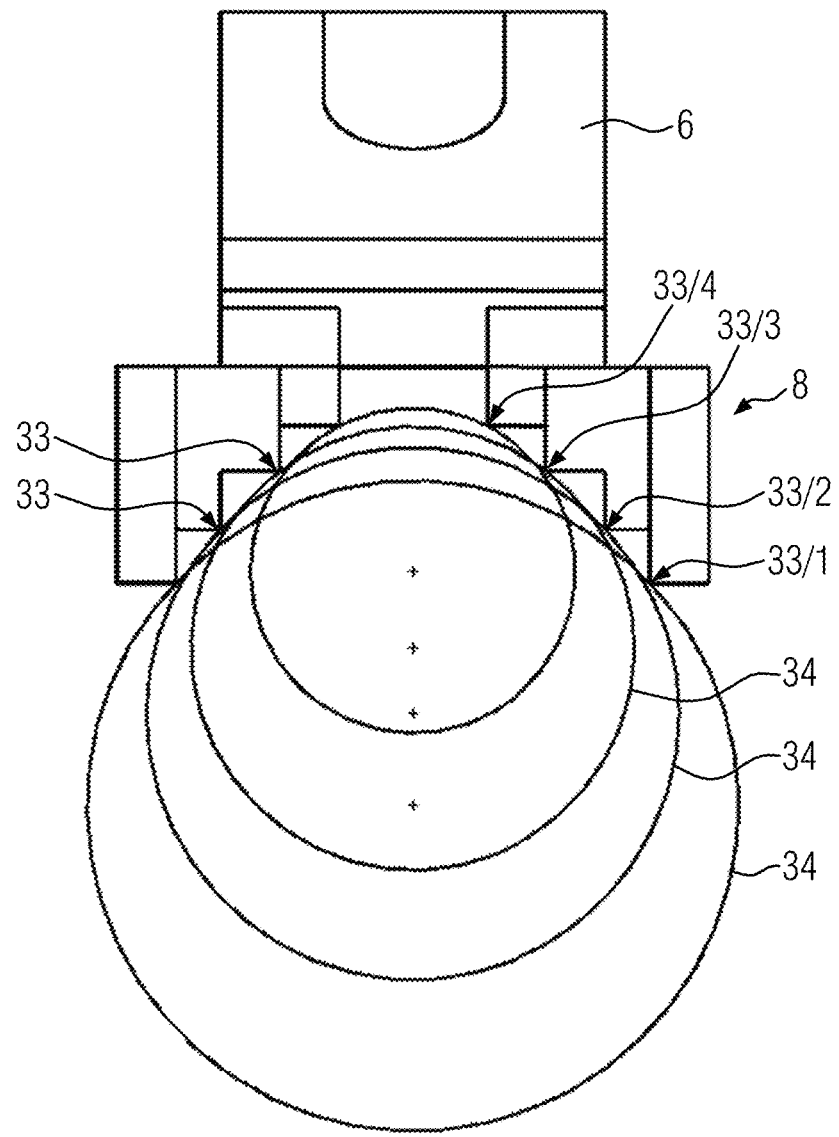
Figure 9:
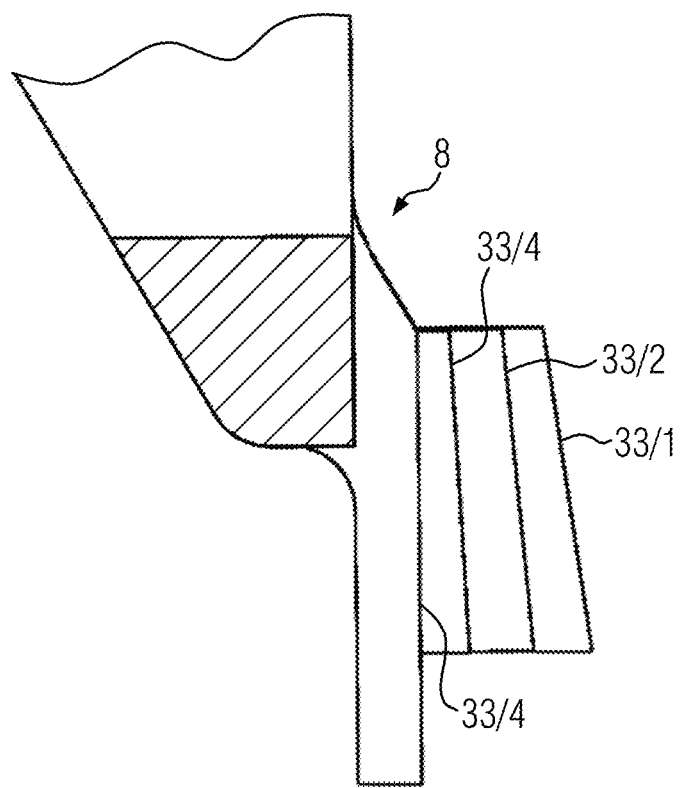
Figure 10:
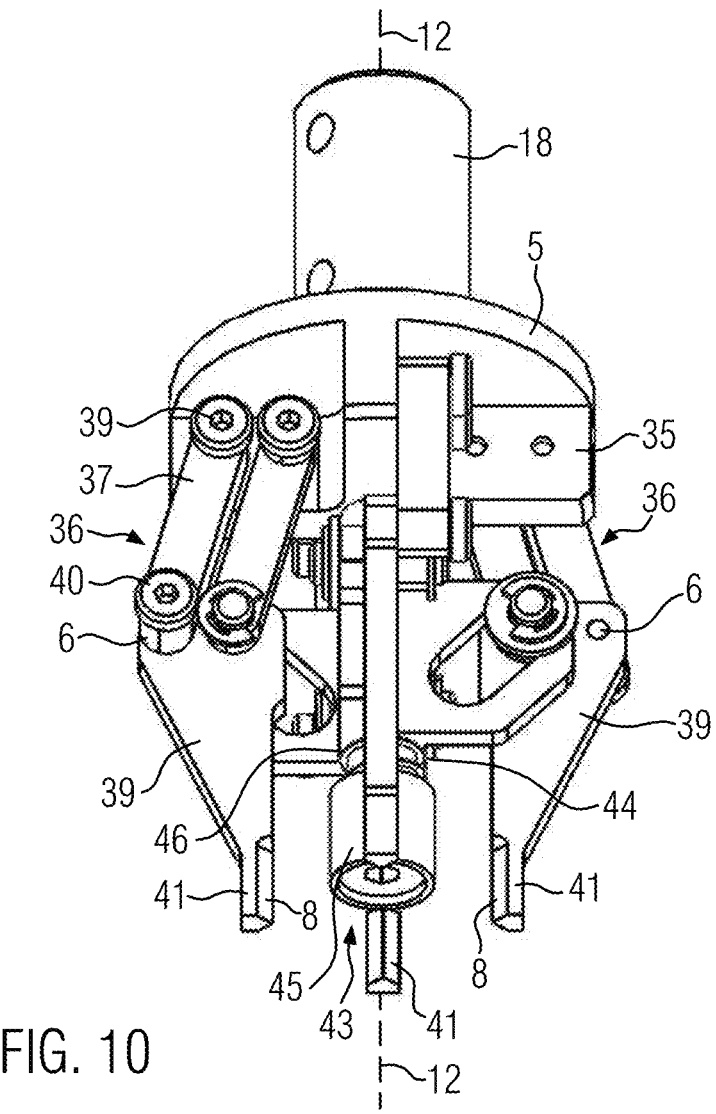
Figure 11:
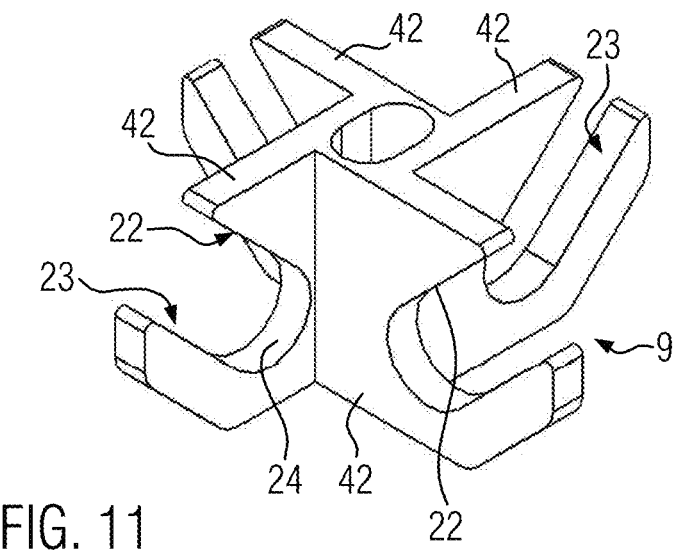
Figure 12:
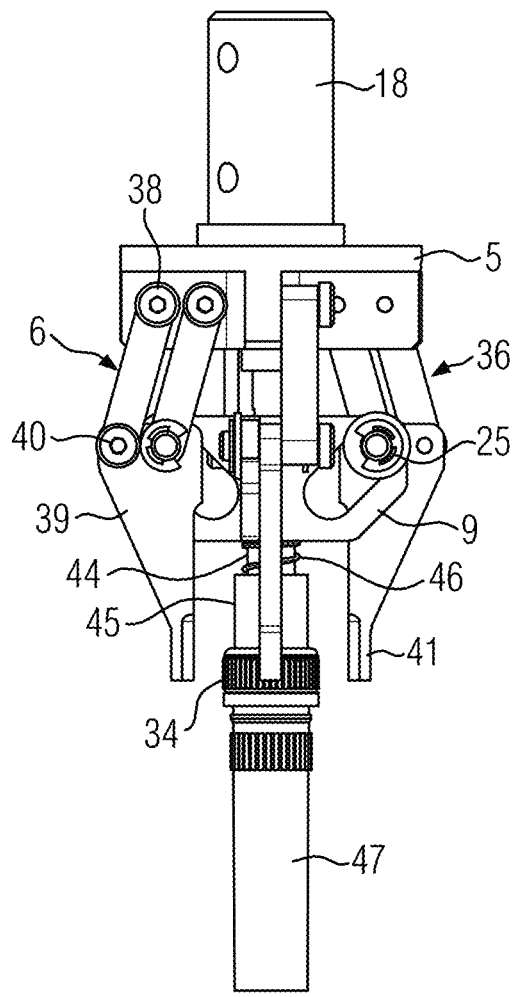
Figure 13:
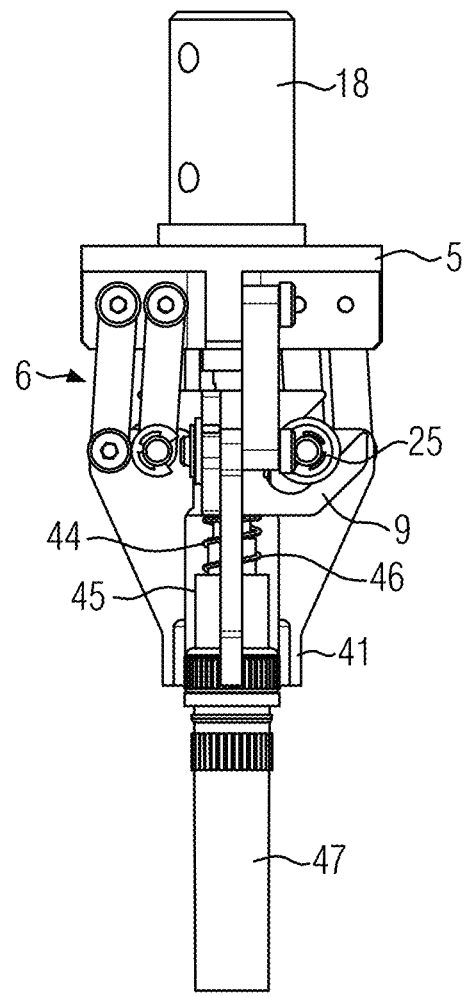
Figure 14:
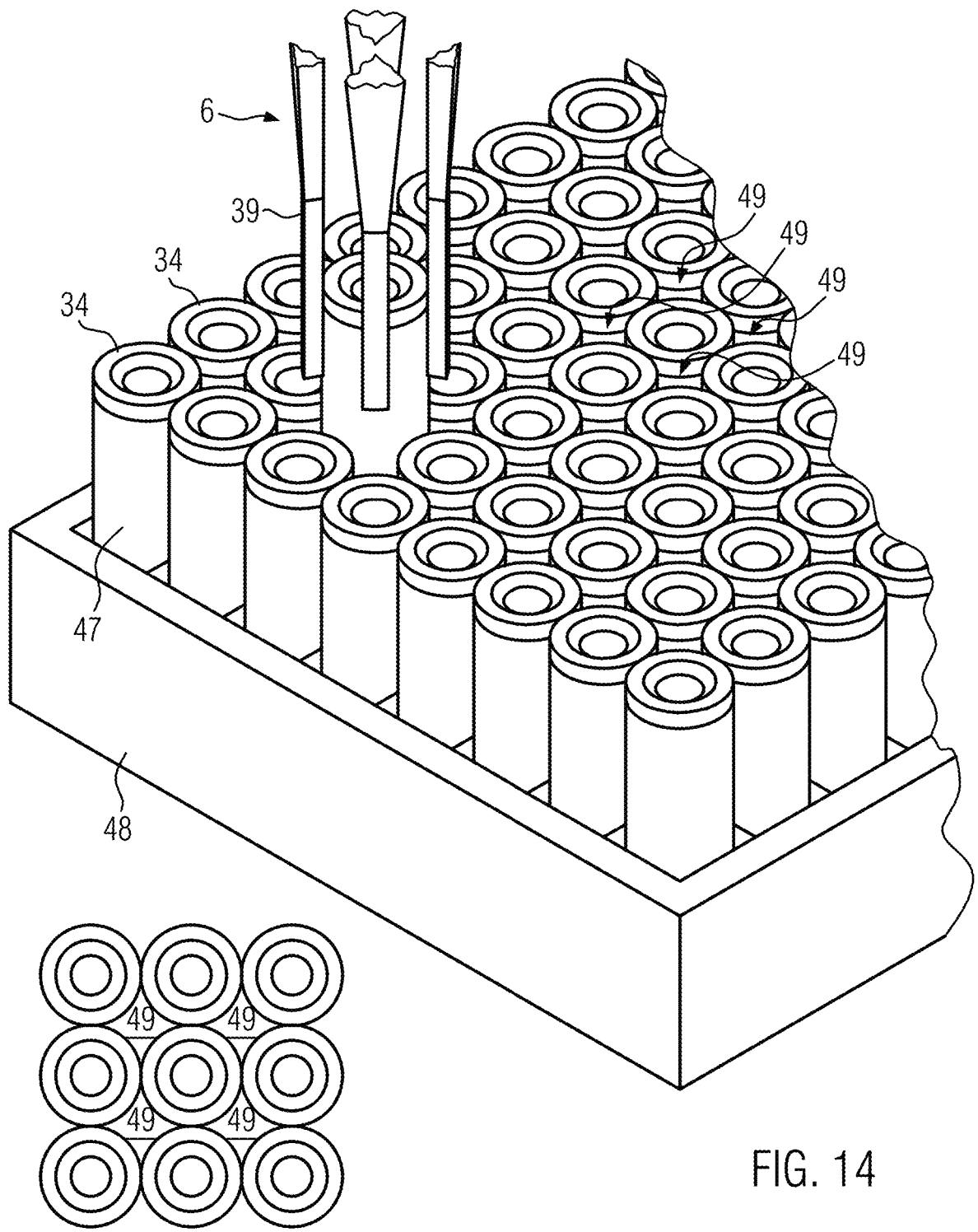

The invention is explained in detail below, by way of example, with the aid of the drawings, which show in:

FIG. 1 a gripper device in a perspective view with a gripper unit according to a first embodiment FIG. 2 a gripper unit according to a second embodiment, which is similar to a gripper unit used in the gripper device of Figure 1 and differs only in the length of gripper levers, in a perspective view FIG. 3*a* the gripper unit of FIG. 1 in a sectional view FIG. 3*b* shows the gripper unit wherein the guiding faces have a curved path with path sections inclined differently relative to the longitudinal center axis of the gripper device, wherein the path sections located closer to the longitudinal center axis have a lesser inclination relative to the longitudinal center axis than the path sections located further away FIG. 4 the gripper unit of FIG. 3*a* together with a guide rod with a coupling element for an electromagnetic motor, in a partly sectional view FIG. 5 the gripper unit of FIG. 3*a* with a guide rod, which is coupled to a pneumatic actuator, in a partly sectional view FIG. 6 a gripper device in a perspective view, with a pneumatic actuator FIG. 7 the embodiment of a gripper unit with long gripper levers according to FIG. 2, in a partly sectional view FIG. 8 a gripper jaw in a top view FIG. 9 the gripper jaw of FIG. 8 in a partly sectional view, looking from the side FIG. 10 a gripper unit according to a third embodiment with four gripper levers in a perspective view at an angle from below FIG. 11 a guiding element of the gripper unit according to FIG. 10 in a perspective view FIG. 12 the gripper unit of FIG. 10 in the opened state, in which it is placed on a lid of a reaction vessel, in a perspective view, and FIG. 13 the gripper unit of FIG. 10 in the closed state, in which it grips a lid of a reaction vessel, in a perspective view, and FIG. 14 the gripper unit of FIG. 10 in the course of gripping and removing a reaction vessel from a rack in which many reaction vessels are arranged in a regular grid.

A first embodiment of a gripper device 1 according to the invention comprises a gripper unit 2 according to a first embodiment, a rotation unit 3 for rotating the gripper unit 2 and an actuator unit 4 for actuating the gripper unit 2 (FIG. 1).

The gripper unit 2 has a main body 5 to which two gripper lever 6s are each pivotably fastened by one end to a pivoting joint 7. A gripper jaw 8 is formed at the end of the gripper lever 6 remote from the respective pivoting joint 7. The gripper jaws 8 of the two gripper levers 6 are arranged facing one another (FIGS. 2, 3).

The gripper unit 2 has a guiding element 9 which is fastened to a guide rod 10. The guide rod 10 is movably mounted in a guiding bush 11, so that the guiding element 9 is movably arranged on the main body 5. A longitudinal axis of the guide rod 10 also forms a longitudinal centre axis 12 of the gripper device 1. The gripper levers 6 and also the guiding element 9 are arranged and formed mirror-symmetric to the longitudinal centre axis 12.

The guide rod 10 extends from the guiding element 9 through the rotation unit 3 to the actuator unit 4. The guide rod 10 may be fitted into the actuator unit 4 by its end which is furthest from the guiding element 9, or also pass through the former and be separately and movably mounted in a separate guiding jaw 13 (FIG. 1).

The gripper device 1 is normally used in such a way that the gripper levers 6 with their gripper jaws 8 point downwards. Therefore, in the present description, a downwards direction means a direction from the rotation unit 3 or actuator unit towards the gripper jaws 8, and an upwards direction means a direction from the gripper unit 2 towards the rotation unit 3 or actuator unit 4. Of course the gripper device 1 may also be so arranged in use that the gripper jaws 8 face to the side or upwards, even when this is not so common.

The main body 5 is surrounded by a roughly cuboid casing 16 with two broad side walls 14 and two narrow side walls 15. Formed in the centre of the main body 5 is a through opening, while the main body 5 has a hollow-cylindrical cylinder section 17 which, in the area of the through opening, extends downwards from the top. Located in this cylinder section 17 is the guiding bush 11, which extends downwards beyond the cylinder section 17 and at its top end forms a ring bar, with which it is in contact with the top 16 from above. Formed on the main body 5 is another upper cylinder section 18, which in turn is located concentric to the through opening and the longitudinal centre axis 12 respectively and has a somewhat greater inside diameter than the lower cylinder section 17, so that there is sufficient space for the ring bar of the guiding bush 11.

Formed on the edge of the top 16 are two vertical strip-shaped wall sections, each with a threaded hole, so that the top 16 may be connected by suitable screws (not shown) to the tubular casing body formed by the broad side walls 14 and the narrow side walls 15.

The pivoting joints 7 of the gripper levers 6 are each penetrated by a shaft 19. The main body 5 has two vertical wall sections which extend downwards at the edge of a top section 5/1 of the main body, and so are arranged parallel and with some play within an upper section 14/1 (FIG. 2) of the two opposite broad side walls 14. The top section 5/1 and the vertical wall sections thus form in cross-section a U-shaped profile which is open downwards. The shafts 19 are fastened by their ends to the vertical wall sections of the main body 5.

The gripper levers 6 have in the area between the pivoting joint 7 and the gripper jaws 8 a slot-like recess 20 (FIG. 2), which extends parallel to the broad side walls 14. The slot-like recess 20 has a clear width, so that the guiding element 9, which is plate-like in form, has room with some play inside.

The guiding element 9 is fastened to the lower end of the guide rod 10 and extends in the horizontal direction through both slot-like recesses 20 of the two gripper levers 6. The guiding element 9 has two blind-hole type recesses 21, opening out upwards. These recesses form in each case an inner guiding edge or guiding face 22, an outer guiding edge or guiding face 23, together with a base section 24. The guiding faces 22, 23 run from bottom to top with increasing distance from the longitudinal centre axis 12.

In the area of the slot-like recesses 20 of the gripper levers 6, there is provided in each case a counter-guiding element 25 which in the present embodiment is a rotatably mounted disc, in particular in the form of a ball bearing. The space between the respective inner guiding face 22 and the adjacent outer guiding face 23 is so dimensioned that the counter-guiding element 25 may be held with some play between the respectively opposite guiding faces 22, 23.

The guide rod 10 extends from the guiding element 9 a short distance upwards through the guiding bush 11. The upper end of the guide rod 10 ends in the area of the upper cylinder section 18. The cylinder rod is provided at the upper end with an external thread, so that a ring 26 with an internal thread may be screwed onto the guide rod 10. Provided between the ring 26 and the ring bar of the guiding bush 11 is a spring element 27 which in the present embodiment is a coil spring. The spring element 27 is under a certain preload, so that it presses the guide rod 10 and with it the guiding element 9 upwards. The preload may be changed by adjusting the position of the ring 26 on the guide rod 10. In addition, washers may be inserted between the ring 26 and the spring element 27 to increase spring tension, As an alternative to the provision of a linear spring, the spring element 27 may also be in the form of a non-linear spring, for example a disc spring. This results in the gripping forces being high when the gripper jaws 8 are clamped and lower when the gripper jaws 8 are opened. A similar force-travel characteristic may be obtained by loading the gripper jaws 8 with a further force in the closed state. This force may be provided for example in the form of a passive permanent magnet which is so arranged that loading with a magnetic force is effected between one of the moving parts (e.g. the ring 26) and one of the stationary parts (e.g. the upper cylinder section 18) of the gripper device 1.

The upwards facing end face of the guide rod 10 has a conical recess. In contact with this conical recess is a second part of the guide rod 10, which is designed as a separate component. This upper guide rod 10/2 is able, by means of the actuator unit 4, to press against the lower guide rod 10/1, and so displace it. If the upper guide rod 10/2 is raised then, through the action of the spring element 27, the lower guide rod 10/1 follows the movement of the upper guide rod 10/2. The upper guide rod 10/2 has a downwards pointing tip 29, which fits positively into the conical recess 28 of the lower guide rod 10/1. Naturally the end faces of the two guide rods 10/1 and 10/2 may be planar or otherwise shaped for suitable interaction. With the movement of the guide rod 10, the guiding element is also moved a little up and down. Here, the counter-guiding elements 25 are located in the respective guiding recesses 21 so that, in the course of a downwards movement, the counter-guiding elements 25 are pressed outwards through the inner guiding faces 22, leading to opening of the gripper levers 6, and with an upwards movement, the counter-guiding elements 25 are pressed outwards through the outer guiding faces 23, so that the gripper levers 6 with their gripper jaws 8 are pressed together. FIG. 4 shows the pressed-together or closed position, and FIG. 3a shows the pressed-apart or open position. Thus, by movement of the guide rod 10, the gripper unit 2 may be opened and closed in a controlled manner.

The play with which the counter-guiding elements 25 are held between the respective inner and outer guiding faces 22, 23, should be slight, so that the hysteresis caused by it on opening and closing is as small as possible. On the other hand, the counter-guiding elements 25 should not be in contact with the inner and outer guiding faces 22, 23 simultaneously, since this could otherwise block the movement.

In the present embodiment, the inner and the outer guiding faces each run in a straight line. Within the scope of the present invention it is however also possible that the inner and outer guiding faces each have differently inclined sections, so that the movement of the guide rod 10 has varying strength in an opening or a closing movement.

In the present embodiment, the gripper unit 2 is closed by the action of the spring element 27. It is however also possible to incline the inner and outer guiding faces 22, 23 relative to the longitudinal centre axis 12, so that they reduce their distance from the longitudinal centre axis 12 from bottom to top. With such a design of the guiding faces 22, 23, an upward movement of the guiding element 9 would cause the gripper unit 2 to open, whereby the spring action of the spring element 27 would lead to opening of the gripper unit.

In the present embodiment, the guiding element 9 extends sideways through the two slot-like recesses 20 of the gripper levers 6. Within the scope of the invention it is also possible to make the gripper levers 6 only plate-like in form, while counter-guiding elements 25 may be arranged on both sides of the gripper levers 6, with the guiding element 9 then being so designed that it makes contact on both sides of the gripper levers 6. This may be effected for example by means of a slot-like recess in the guiding element, in which the gripper levers 6 are located.

It is however in principle also possible to make the gripper lever 6 plate-shaped and to provide a plate-shaped guiding element 9 which acts only on one side of the gripper levers 6. In this case it may be expedient to provide support elements for the guiding element 9 and/or the gripper levers 6, to counteract asymmetric loading.

As can be seen with the aid of FIG. 1, the gripper unit 2, the rotation unit 3 and the actuator unit 4 are fastened to a common retaining plate 30, so that the whole gripper device 1 forms a unit. The upper cylinder section 18 of the gripper unit 2 is rotatably mounted by means of suitable bearings 31, in particular ball bearings 31 (FIG. 5). The bearings 31 encompass the upper cylinder section 18 in the lower area. In the upper area of the upper cylinder section 18 the latter is covered by a jaw 32 which is connected to the rotation unit 3. The jaw 32 is so connected to the upper cylinder section 18 that a non-rotatable connection between the jaw 32 and the upper cylinder section 18 is made. Thus, the rotation unit 3 can transmit a rotary movement to the gripper unit 2. The non-rotatable connection between the jaw and the cylinder unit 18 may be positive (e.g. using slots and springs), force-locking (e.g. using screws) and/or friction locking.

The rotation unit has a step motor, so that the gripper unit may be rotatably adjusted around the longitudinal centre axis 12 in an angular position which may be essentially as desired but is defined. Since the guide rod 10 is formed in two parts, the lower part of the guide rod 10/1 may be rotated relative the upper part of the guide rod 10/2. The upper part of the guide rod 10/2 executes only a translational movement, by which a downwards or upwards movement is performed. On rotation of the lower part of the guide rod 10/1, the upper part of the guide rod 10/2 is preferably raised, so that the two parts 10/1 and 10/2 do not rub against one another.

In the preferred embodiment, the actuator unit 4 is in the form of an electromagnetic actuator (FIG. 1, FIG. 4). This may however also be a pneumatic actuator (FIGS. 5, 6). Due to the two-part design of the guide rod, there is decoupling between the gripper unit 2 and the actuator unit 4. Because of this, the gripper unit 2 may be easily combined with any desired actuator unit 4.

The gripper jaws have preferably one or more vertically running gripping edges, in particular cutting edges, with which the gripper jaws grip a lid at its peripheral surface and in particular cut into the peripheral surface of the lid in order to grip it (FIGS. 3, 4, 5). Preferably, one gripper jaw has two such gripping edges and the other gripper jaw a single gripping edge, thus effecting a three-point support at the periphery of the lid. It is however also possible to provide a different number of gripping edges, in particular in each case two gripping edges on one gripper jaw.

The gripper jaws 8 may however also have, viewed from above, a stepped gripping surface with several steps 33. The steps run roughly vertically and along a circular segment surface or a funnel-shaped surface, which is roughly concentric or symmetric to the longitudinal centre axis of the gripper device. (FIGS. 8, 9). This makes possible the reliable gripping of lids 34 of different diameter, with each gripper jaw acting on the lid with four steps 33 in each case (FIGS. 2, 7, 8). This allows the gripping of four lids 34 of different size with a single gripper device 1. Since, in the case of the present gripper device 1, the gripper levers 6 are mounted at one end by means of a pivoting joint 7, the inclined position in the area of the gripper jaws 8, on opening of the gripper levers 6, is slight, which facilitates the gripping of lids of different size. In the present embodiment, the individual steps 33/1 to 33/4 or gripping edges are differently inclined relative to the longitudinal centre axis 12 of the gripper device 1 (FIG. 9). Thus, the different opening angle of the gripper jaws 8 is offset by differing opening width of the gripper jaws 8, and the steps 33/1 to 33/4 or gripping edges lie roughly flat on the periphery if the respective lid.

The length of the gripper levers 6 may be adapted to the application concerned. The appended drawings show two embodiments with gripper levers 6 of different length, wherein FIGS. 1, 3, 4, 5 and 6 show an embodiment with short gripper levers and FIGS. 2, 7 an embodiment with long gripper levers.

Within the scope of the invention it is also possible that the gripper jaws with their gripping faces are designed with sections differently inclined relative to the longitudinal centre axis 12 of the gripper device 1.

A third embodiment of a gripper unit 2 will be explained below with the aid of FIGS. 10 to 14. This third embodiment of the gripper unit 2 corresponds in basic design to the two embodiments of the gripper unit 2 described above, for which reason identical parts are designated by the same reference number. The descriptions of these parts are not repeated below, so that for these parts the comments made above apply, unless otherwise stated below. The gripper unit 2 according to the third embodiment may be inserted in the gripper device 1 described above and may be used with it. All three embodiments of the gripper units 2 are interchangeable as desired.

The gripper unit 2 of the third embodiment has four gripper levers 6, in contrast to the gripper units 2 described above.

Each of the gripper levers 6 is pivotably mounted on a main body 5, circular in a top view, by an upwards facing upper cylinder section 18. The main body 5, circular in a top view, forms a circular disc, on the underside of which are formed four bars 35, protruding vertically downwards. The bars 35 form a cross when viewed from below.

Pivotably mounted on each side face of one of the bars 35 is one of the gripper levers 6. Each of the gripper levers 6 has a parallel guide 36. Each parallel guide 36 is formed by two pivoting levers arranged parallel to one another. The pivoting levers 37 of a parallel guide 36 are in each case pivotably fastened to one of the bars 35 by a pivoting joint 38. Provided at the other end of the parallel guide 36 is in each case a gripper section 39 of the respective gripper lever 6. Each of the pivoting levers 37 is pivotably fastened to the gripper section 39 by its end furthest from the main body 5, in each case pivotable by means of a pivoting joint 40.

The gripper section 39 has a wide end section on which the pivoting levers 37 are pivotably fastened and taper downwards. At the lower end section, each of the gripper sections 39 forms an inwards facing gripper jaw 8. In the area of the gripper jaw 8, the gripper section 39 becomes a thin, roughly pin- or rod-shaped gripper jaw section 41.

The gripper jaw sections 41 run roughly parallel to the longitudinal centre axis 12 of the gripper unit 2 and the gripper device 1 respectively. Since the gripper levers 6 are each formed by one of the parallel guides 36, the gripper jaw sections 41 hold their position parallel to the longitudinal centre axis 12 on pivoting of the gripper levers 6. When the pivoting lever 6 is pivoted, the gripper jaw sections 41 are moved outwards or inwards relative to the longitudinal centre axis 12, but this does not put them into an inclined position relative to the longitudinal centre axis 12. By means of this pivoting movement of the gripper levers 6, on opening and closing of the gripper unit 2, the gripper levers are moved in a straight line radially outwards or inwards relative to the longitudinal centre axis 12. Internal tests were made with another mechanism, in which the gripper arms, viewed from above, were moved along a spiral path towards and away from the longitudinal centre axis 12. However, this did not prove successful, since such a mechanism requires much space around the reaction vessel, in order to grip it reliably. The pivoting movement in a straight line viewed from above is therefore of considerable advantage.

The gripper unit 2 of the third embodiment, similar to the gripper units 2 of the embodiments described above, has a guiding element 9 which works in conjunction with corresponding counter-guiding elements 25 which are fitted to the gripper levers 6.

The guiding element 9, as in the embodiments described above, is fastened at its lower end to a guide rod 10. The design and arrangement of the guide rod 10 also corresponds to that of the embodiment described above (see for example FIG. 3a). The guiding element 9 has four vanes 42, cross-shaped in a top view, with a slight offset in the centre. Each vane 42 has a blind-hole-shaped recess 21, opening out at the top. These recesses form in each case an inner guiding edge or guiding face 22, an outer guiding edge or guiding face 23, plus a base section 24. The guiding faces 22, 23 run upwards from below, with increasing clearance from the longitudinal centre axis 12.

Provided on the guiding section 9 in the upper end section in each case is one of the counter-guiding elements 25 which, in the present embodiment, is a rotatably mounted disc, in particular in the form of a ball bearing. The distance between the respective inner guiding face 22 and the adjacent outer guiding face 23 is so dimensioned that the counter-guiding element 25 may be held with some play between the respectively opposite guiding faces 22, 23. The operating principle of the guiding element 9 and the counter-guiding elements 25 is exactly the same as in the embodiments described above. If the guiding element 9 is moved a short distance upwards in the gripper unit 2 by means of the guide rod 10, then the counter-guiding elements 25 roll along the corresponding outer guiding faces 23, causing the respective lever arm 6 to pivot inwards, i.e. towards the longitudinal centre axis 12. On lowering the guiding element, the counter-guiding elements 25 roll along the inner guiding face 22, causing the lever arms 6 to be pressed outwards and therefore away from the longitudinal centre axis 12. Through the movement of the guiding element 9 up or down, the four gripper jaws 8 may be synchronously moved apart or together. Thus, the gripper unit 2 may be opened or closed.

The modifications of the guiding element described above for the first and second embodiments (straight guiding faces or guiding faces with differently inclined sections; guiding faces on the pivoting lever 6 and counter-guiding elements 25 located on the guiding element 9), in particular of the guiding edges and guiding faces, apply equally to the third embodiment.

A spacer 43 may be provided optionally on the underside of the guiding element 9. The spacer 43 has a pin 44 which is arranged concentrically to the longitudinal centre axis 12 and fastened to the guiding element 9. Provided at the lower end section of the pin 44 is a hold-down bushing 45 encompassing the pin 44. The hold-down bushing 45 is mounted on the pin 44 so as to be movable vertically, while on the pin 44 a stop and on the hold-down bushing 45 a corresponding counter-stop are provided, so that the hold-down bushing 45 cannot be moved outwards beyond a lower end position. Arranged around the pin 44 is a coil spring 46, which is tensioned between the hold-down bushing 45 and the guiding element 9, and presses the hold-down bushing 45 away from the guiding element 9.

As may be seen with the aid of FIGS. 12 and 13, the gripper unit 2 with the hold-down bushing 45 may be placed on the top of a lid 34 of a reaction vessel. The spacer 43 ensures that the gripper unit 2 does not engage too deeply on the reaction vessel, but only grips the lid 34 with its gripper jaws 8. This is expedient in particular when one wishes to use the gripper unit 2 to unscrew the lid from the reaction vessel. Then the gripper unit 2 may act only on the lid 34 and not on the reaction vessel itself. This is ensured with the aid of the spacer 43. The spring-loaded spacer 43 also provides, on opening of the gripper unit 2, for the lid to be pressed downwards out of the gripper unit 2 and ejected.

There may however also be applications in which the reaction vessel and not the lid are to be gripped. If for example it cannot be ensured that all lids are correctly screwed onto the relevant reaction vessel, then it is safer to grip the reaction vessel concerned rather than a lid resting at an angle on the reaction vessel. In such applications it is expedient to use the gripper unit 2 without a spacer 43. With such an application it may also be expedient to make the gripper jaw sections 41 longer than is shown in FIGS. 10-13.

Reaction vessels 47 are often held in a stand 48 (FIG. 14). The stand 48 is often also called a rack. The reaction vessels 47 are arranged with as high a packing density as possible in a regular grid which is in particular square. The reaction vessels 47 are arranged with the minimum possible distance between them. Since the reaction vessels and their lids are usually circular viewed from above, in such a rack four intermediate areas 49, also known as spandrels, form around each reaction vessel 47. These spandrels 49 are arranged, in a top view, at the four corners of a square which surrounds each reaction vessel 47.

With the gripper unit 2 according to the third embodiment it is possible to move, in each case with one of the four gripper levers 6, into one of the spandrels 49 arranged around a reaction vessel 47 and to grip, safely and reliably, the reaction vessel itself or the reaction vessel at its lid. Since the gripper jaw sections 41 are thin, elongated, vertically aligned pin- or rod-like elements, they may be inserted reliably into the smallest spandrel areas. Here it is also of advantage that, on pivoting outwards of the lever arms 6, the gripper jaw sections 41 maintain their parallel position relative to the longitudinal centre axis 12.

This gripper unit 2 is therefore suitable for gripping reaction vessels of different size or reaction vessels with different sized lids. The reaction vessels may be arranged lying close together in a rack. Nevertheless, they may be gripped reliably.

Due to the closing of the gripper unit 2, forcibly guided by the guiding element 9, lids may be held firmly, so that high torque levels may be transferred from the gripper unit 2 on to the lids. It has been shown that the torque levels exerted by the gripper unit on the lids may be greater than the maximum torques usually applicable by operators in opening or closing.

If for example a reaction vessel closed by a lid is held by the gripper unit 2 and moved to a static gripper jaw which can hold the reaction vessel with high forces, then the lid may be removed or unscrewed from such a reaction vessel reliably. This allows the use of such a gripper unit 2 in an automatic process, in which a multiplicity of reaction vessels are handled. If for example, in the reaction vessels, reactions are taking place which lead to a vacuum, then this has the effect of holding the lid to the reaction vessel with high forces. Even in such cases, the lid may be removed reliably with this gripper unit 2, so long as a suitable holding device for the reaction vessel is provided, which can absorb correspondingly high forces.

LIST OF REFERENCE NUMBERS 1 gripper device
2 gripper unit
3 rotation unit
4 actuator unit
5 main body
6 gripper lever
7 pivoting joint
8 gripper jaw
9 guiding element
10 guide rod
11 guiding bush
12 longitudinal centre axis
13 guiding jaw
14 broad side wall
15 narrow side wall
16 casing
17 lower cylinder section
18 upper cylinder section
19 shaft
20 slot-like recess
21 recess
22 inner guiding face
23 outer guiding face
24 base section
25 counter-guiding element
26 ring
27 spring element
28 conical recess
29 tip
30 retaining plate
31 bearing
32 jaws
33 step
34 lid
35 bar
36 parallel guide
37 pivoting lever
38 pivoting joint
39 gripper section
40 pivoting joint
41 gripper jaw section
42 vane
43 spacer
44 pin
45 hold-down bushing
46 coil spring
47 reaction vessel
48 stand
49 intermediate area/spandrel

The invention claimed is:

1. A gripper device for gripping laboratory vessels, comprising a gripper unit with a main body to which four gripper levers are each pivotably fastened by one end to a pivoting joint in each case, wherein in each case a gripper jaw is formed at the end of the gripper lever remote from the respective pivoting joint, such that the gripper jaws are arranged facing one another,
wherein the gripper levers each have a parallel guide which is pivotably mounted on the main body wherein, on a section of the parallel guide remote from the main body, there is provided a gripper section of the gripper lever on which in each case one of the gripper jaws is formed, wherein in the area of the gripper jaw, the gripper section becomes a thin, roughly pin-or rod-shaped gripper jaw section and the gripper jaw sections run roughly parallel to a longitudinal center axis of the gripper device;
wherein the gripper unit may be actuated by a guide rod to pivot the gripper lever,
wherein the guide rod is formed in two parts, and a lower part of the guide rod may be rotated relative to an upper part of the guide rod and the upper part of the guide rod executes only a translational movement, by which a downwards or upwards movement is performed so that on rotation of the lower part of the guide rod, the upper part of the guide rod is raised, so that the two parts and do not rub against one another.

2. The gripper device according to claim 1, wherein a motor is provided for rotating the gripper unit.

3. The gripper device according to claim 1, wherein the gripper levers are arranged with mirror-symmetry and/or rotation-symmetry to a longitudinal center axis of the gripper device without crossing the longitudinal center axis.

4. The gripper device according to claim 1, wherein the gripper levers are so designed that, on opening and closing of the gripper unit, they are moved radially in a straight line outwards or inwards relative to a longitudinal center axis.

5. A gripper device for gripping laboratory vessels, comprising a gripper unit with a main body to which four gripper levers are each pivotably fastened by one end to a pivoting joint in each case, wherein in each case a gripper jaw is formed at the end of the gripper lever remote from the respective pivoting joint, such that the gripper jaws are arranged facing one another,
wherein the gripper levers each have a parallel guide which is pivotably mounted on the main body wherein, on a section of the parallel guide remote from the main body, there is provided a gripper section of the gripper lever on which in each case one of the gripper jaws is formed, wherein in the area of the gripper jaw, the gripper section becomes a thin, roughly pin-or rod-shaped gripper jaw section and the gripper jaw sections run roughly parallel to a longitudinal center axis of the gripper device;
wherein
a guiding element is provided which is movably mounted on the main body and two inner and outer guiding faces are formed on the guiding element or on the gripper levers respectively, and the gripper levers or the guiding element each have a counter-guiding element which is arranged between one of the inner and one of the outer guiding faces, so that when the guiding element is moved, the gripper levers with their gripper jaws are pivoted apart or pressed together.

6. The gripper device according to claim 5, wherein the guiding element is loaded by means of a spring in such a way that, in the relaxed state of the spring, the gripper jaws are pressed together, wherein a motor is provided for rotating the gripper unit.

7. A gripper device for gripping laboratory vessels, comprising a gripper unit with a main body to which at least two gripper levers are each pivotably fastened by one end to a pivoting joint in each case, wherein a gripper jaw is formed at the end of each gripper lever remote from the respective pivoting joint, such that the gripper jaws are arranged facing one another,
wherein a guiding element is provided which is movably mounted on the main body and two inner and outer guiding faces are formed on the guiding element or on the gripper levers respectively, and the gripper levers or the guiding element each have a counter-guiding element which is arranged between one of the inner and one of the outer guiding faces, so that when the guiding element is moved, the gripper levers with their gripper jaws are pivoted apart or pressed together, wherein the guiding element is loaded by means of a spring in such a way that, in the relaxed state of the spring, the gripper jaws are pressed together, wherein a motor is provided for rotating the gripper unit;

wherein the guiding faces are formed roughly straight, with a certain inclination relative to a longitudinal center axis of the gripper device and wherein the inclination of the guiding faces is so designed that, for opening the gripper device, the guiding element is to be moved towards the gripper jaws and in its end position comes to lie adjacent to the gripper jaws, so that it serves as ejector for a lid gripped between the gripper jaws.

8. The gripper device according to claim 7, wherein a preload of the spring is adjustable.

9. The gripper device according to claim 7, wherein the gripper unit has three or four gripper levers.

10. The gripper device according to claim 7, wherein the guiding element is connected to a guide rod, which is guided in a guiding bush formed on the main body and the gripper levers are arranged with approximate mirror-symmetry to the guide rod.

11. The gripper device according to claim 10, wherein the guide rod is arranged roughly along a longitudinal center axis of the gripper device.

12. Gripper device according to claim 7, wherein an actuator is provided for linear movement of the guiding element.

13. Gripper device according to claim 12, wherein the actuator has a spindle drive driven by an electric motor or a linear drive driven by an electromagnet, a pneumatic cylinder or a hydraulic cylinder.

14. Gripper device according to claim 7, wherein the motor is coupled to the gripper unit by means of a tubular shaft, so that a guide rod may be guided through the shaft.

15. Gripper device according to claim 7, wherein the counter-guiding elements are sliding elements, which slide along one of the inner or one of the outer guiding faces.

16. Gripper device according to claim 7, wherein the counter-guiding elements are arranged with minimal play between in each case one of the inner and one of the outer guiding faces, so that each counter-guiding element is in contact in each case only with the inner or only with the outer guiding face.

17. A gripper device for gripping laboratory vessels, comprising a gripper unit with a main body to which at least two gripper levers are each pivotably fastened by one end to a pivoting joint in each case, wherein a gripper jaw is formed at the end of each gripper lever remote from the respective pivoting joint, such that the gripper jaws are arranged facing one another, wherein a guiding element is provided which is movably mounted on the main body and two inner and outer guiding faces are formed on the guiding element or on the gripper levers respectively, and the gripper levers or the guiding element each have a counter-guiding element which is arranged between one of the inner and one of the outer guiding faces, so that when the guiding element is moved, the gripper levers with their gripper jaws are pivoted apart or pressed together, wherein the guiding element is loaded by means of a spring in such a way that, in the relaxed state of the spring, the gripper jaws are pressed together, wherein a motor is provided for rotating the gripper unit;

wherein the guiding faces have a curved path with path sections inclined differently relative to the longitudinal center axis of the gripper device, wherein the path sections located closer to the longitudinal center axis have a lesser inclination relative to the longitudinal center axis than the path sections located further away.

* * * * *